(12) United States Patent
Taniguchi et al.

(10) Patent No.: US 8,603,693 B2
(45) Date of Patent: Dec. 10, 2013

(54) OUTPUT LIMITING DEVICE FOR FUEL CELL

(75) Inventors: Ikuhiro Taniguchi, Zushi (JP); Keisuke Suzuki, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1792 days.

(21) Appl. No.: 11/719,588

(22) PCT Filed: Nov. 9, 2005

(86) PCT No.: PCT/JP2005/020991
§ 371 (c)(1),
(2), (4) Date: May 17, 2007

(87) PCT Pub. No.: WO2006/054565
PCT Pub. Date: May 26, 2006

(65) Prior Publication Data
US 2009/0148727 A1    Jun. 11, 2009

(30) Foreign Application Priority Data

Nov. 17, 2004    (JP) ................................. 2004-333234

(51) Int. Cl.
*H01M 8/04* (2006.01)
*H01M 8/12* (2006.01)

(52) U.S. Cl.
USPC ......................................... 429/437; 429/434

(58) Field of Classification Search
USPC .......................................... 429/13, 437, 434
See application file for complete search history.

(56) References Cited

U.S. PATENT DOCUMENTS

| | | | | |
|---|---|---|---|---|
| 4,413,320 A | * | 11/1983 | Brandau et al. | 701/16 |
| 2003/0031905 A1 | * | 2/2003 | Saito et al. | 429/26 |
| 2003/0165725 A1 | | 9/2003 | Kudou et al. | |

FOREIGN PATENT DOCUMENTS

| | | | | |
|---|---|---|---|---|
| JP | | 59-214167 A | | 12/1984 |
| JP | | 60-208067 A | | 10/1985 |
| JP | | 5-74477 A | | 3/1993 |
| JP | | 2002-83621 A | | 3/2002 |
| JP | | 2002-83622 A | | 3/2002 |
| JP | | 2002-184435 A | | 6/2002 |
| JP | | 2003-109637 A | | 4/2003 |
| JP | | 2003109637 A | * | 4/2003 |
| JP | | 2004-146240 A | | 5/2004 |
| JP | | 2004-165004 A | | 6/2004 |
| JP | | 2004-319437 A | | 11/2004 |
| WO | | WO 2004/093230 A1 | | 10/2004 |

* cited by examiner

*Primary Examiner* — Milton I Cano
*Assistant Examiner* — Brent Thomas
(74) *Attorney, Agent, or Firm* — Foley & Lardner LLP

(57) ABSTRACT

An output limiting device for a fuel cell, including: an inlet coolant temperature sensor detecting an inlet coolant temperature at a coolant inlet of the fuel cell; an outlet coolant temperature sensor detecting an outlet coolant temperature at a coolant outlet of the fuel cell; and an output limiter limiting power or current extracted from the fuel cell according to the detected inlet coolant temperature and the detected outlet coolant temperature.

6 Claims, 10 Drawing Sheets

OUTPUT LIMITING DEVICE FOR FUEL CELL

TECHNICAL FIELD

The present invention relates to an output limiting device for a fuel cell which limits the output of the fuel cell for the purpose or the like of protecting the fuel cell and peripheral components.

BACKGROUND ART

A fuel cell is an electrochemical device to convert chemical energy of fuel gas such as hydrogen gas and oxidizer gas containing oxygen electrochemically into electric energy. A typical fuel cell has an electrolyte membrane in contact with an anode and a cathode on either side. Fuel gas is continuously fed to the anode and the oxidizer gas is continuously fed to the cathode. The electrochemical reactions take place at the electrodes to produce an electric current through the electrolyte membrane, while supplying a complementally electric current to a load.

In a fuel cell system, the portion of the energy held by fuel which cannot be extracted as power is converted into heat. If the temperature of the fuel cell thereof is raised above an allowable temperature by this heat, the performance of the fuel cell deteriorates quickly. Accordingly, in the fuel cell system, a cooling system is provided to release heat produced in power generation thereof to the outside of the system through cooling water using a heat exchanger such as a radiator or the like.

In a proton exchange membrane fuel cell, the upper limit of the operating temperature is mainly determined from the upper temperature limit of a solid polymer electrolyte membrane. The fuel cell stack needs to be cooled so that this upper limit of the operating temperature is not exceeded.

Japanese Patent Application Laid-open Publication No. 05(2003)-074477 discloses a technology in which the power extracted from the fuel cell is limited to reduce the amount of heat generated in the fuel cell when the cooling capacity of the system is insufficient in relation to the amount of generated heat. In this technology, when the ambient temperature is too high to sufficiently release heat from a cooling device, the output of the fuel cell is limited according to the ambient temperature, thereby preventing the fuel cell from deteriorating due to excessively high temperature.

DISCLOSURE OF INVENTION

However, in the above-described technology, the limiting value of output of the fuel cell is calculated from the ambient temperature by an output limiting value function generator. Accordingly, there has been the following problem: even in the case where the temperature of cooling water is lower than the maximum allowable temperature by a sufficient margin, i.e., even in a state where larger output power can be extracted from the fuel cell, an output limitation is imposed based on only the ambient temperature, and desired power cannot be extracted.

The present invention was made in the light of the problem. An object of the present invention is to provide an output limiting device for a fuel cell which prevents the fuel cell from being damaged by excessively high temperature and which makes it possible to extract power or current as much as possible.

An aspect of the present invention is an output limiting device for a fuel cell which is cooled by a coolant supplied thereto, comprising: an inlet coolant temperature sensor which detects an inlet coolant temperature at a coolant inlet of the fuel cell; an outlet coolant temperature sensor which detects an outlet coolant temperature at a coolant outlet of the fuel cell; and an output limiter which limits power or current extracted from the fuel cell according to the detected inlet coolant temperature and the detected outlet coolant temperature.

BRIEF DESCRIPTION OF THE DRAWINGS

The invention will now be described with reference to the accompanying drawings wherein.

BEST MODE FOR CARRYING OUT THE INVENTION

Figure 1:
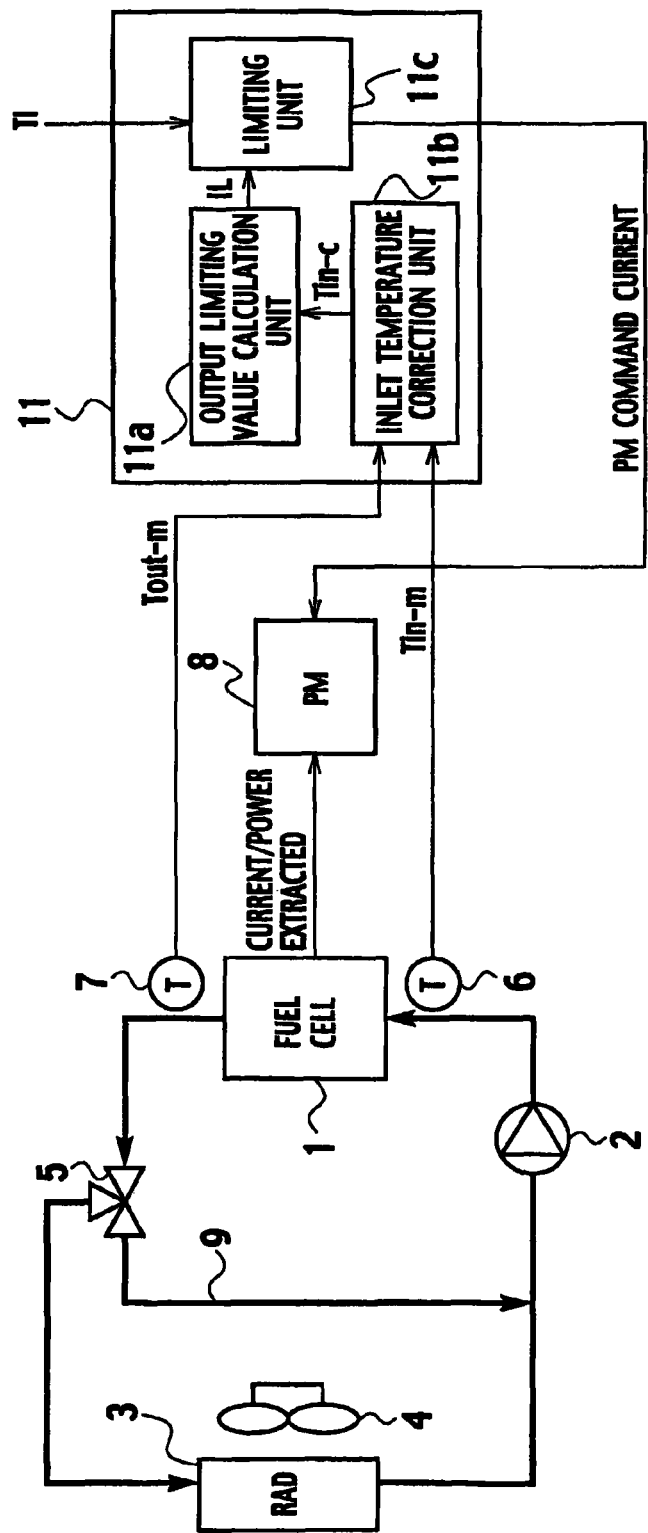
FIG. 1 is a configuration diagram for an output limiting device for a fuel cell according to first and third embodiments of the present invention.

Embodiments of the present invention will be explained below with reference to the drawings, wherein like members are designated by like reference characters. Each embodiment described below is suitable for, but not limited to, a fuel cell vehicle.

First Embodiment

FIG. 1 shows the configuration of a fuel cell system including an output limiting device according to a first embodiment of the present invention. A fuel cell (fuel cell body, also referred to as a fuel cell stack) 1 has an anode supplied with hydrogen gas from a fuel supply device (not shown), and a cathode supplied with air from an air supply device (not shown, and using the hydrogen gas and the air, generates power by the progress of the following electrode reaction:

Anode(hydrogen electrode): 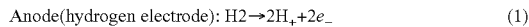  (1)

Cathode(oxygen electrode): 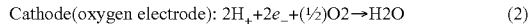  (2)

A cooling system of the fuel cell system includes a pump 2 which circulates a coolant through the system, a coolant passage/channel (not shown) formed inside the fuel cell 1, a three-way valve 5, a radiator 3, a fan 4, and a bypass channel 9.

The coolant discharged from the pump 2 flows through the coolant passage/channel inside the fuel cell 1 and is divided into the radiator 3 and the bypass channel 9 by the three-way valve 5 according to the coolant temperature and the fuel cell load. The coolant which has flown into the radiator 3 releases heat by an air flow produced by vehicle travel or the fan 4 to drop in temperature, and circulates inside the cooling system so as to merge into the coolant passed through the bypass channel 9 and returns to the pump 2, thereby cooling the fuel cell 1.

A power manager 8 controls the current extracted from the fuel cell 1. An inlet coolant temperature sensor 6 and an outlet coolant temperature sensor 7 are temperature sensors which detect the temperatures on the coolant of the fuel cell 1 at coolant inlet and coolant outlet thereof, respectively.

An output limiter 11 limits a command current value to be sent to the power manager 8 according to the values detected by the coolant temperature sensors 6 and 7 when the temperatures become excessively high, thereby limiting the current extracted from the fuel cell 1 by the power manager 8.

The output limiter 11 includes an inlet coolant temperature correction unit 11b which corrects a inlet coolant temperature used in calculating a current limiting value (output limiting value) IL according to the deviation of the coolant temperature Tout-m at the coolant outlet of the fuel cell 1 from a target temperature limit TTL, an output limiting value calculation unit 11a which calculates the current limiting value IL according to the corrected inlet coolant temperature Tin-c, and a limiting unit 11c which limits the current extracted from the fuel cell 1 based on the calculated current limiting value IL.

The inlet coolant temperature correction unit 11b corrects the inlet coolant temperature Tin-m detected by the inlet coolant temperature sensor 6, according to the deviation of the outlet coolant temperature Tout-m detected by the outlet coolant temperature sensor 7 from the target temperature limit TTL. Specifically, in an adder 52, the output (Temp.CV) of a subtractor 51 which subtracts the target temperature limit TTL from the outlet coolant temperature Tout-m is added to the inlet coolant temperature Tin-m, thus obtaining its output Tin-c.

The output limiting value calculation unit 11a calculates the current limiting value IL using an output limiting table 53 according to the inlet coolant temperature Tin-c corrected by the inlet coolant temperature correction unit 11b.

The limiting unit 11c limits a target current TI to be extracted, which has been transmitted from a load control unit of the fuel cell 1 (e.g., drive motor control unit or secondary battery charge/discharge control unit), to the current limiting value IL calculated by the output limiting value calculation unit 11a. The current limiting value IL is issued as a command to the power manager 8, and the current extracted from the fuel cell 1 is limited.

Figure 2:
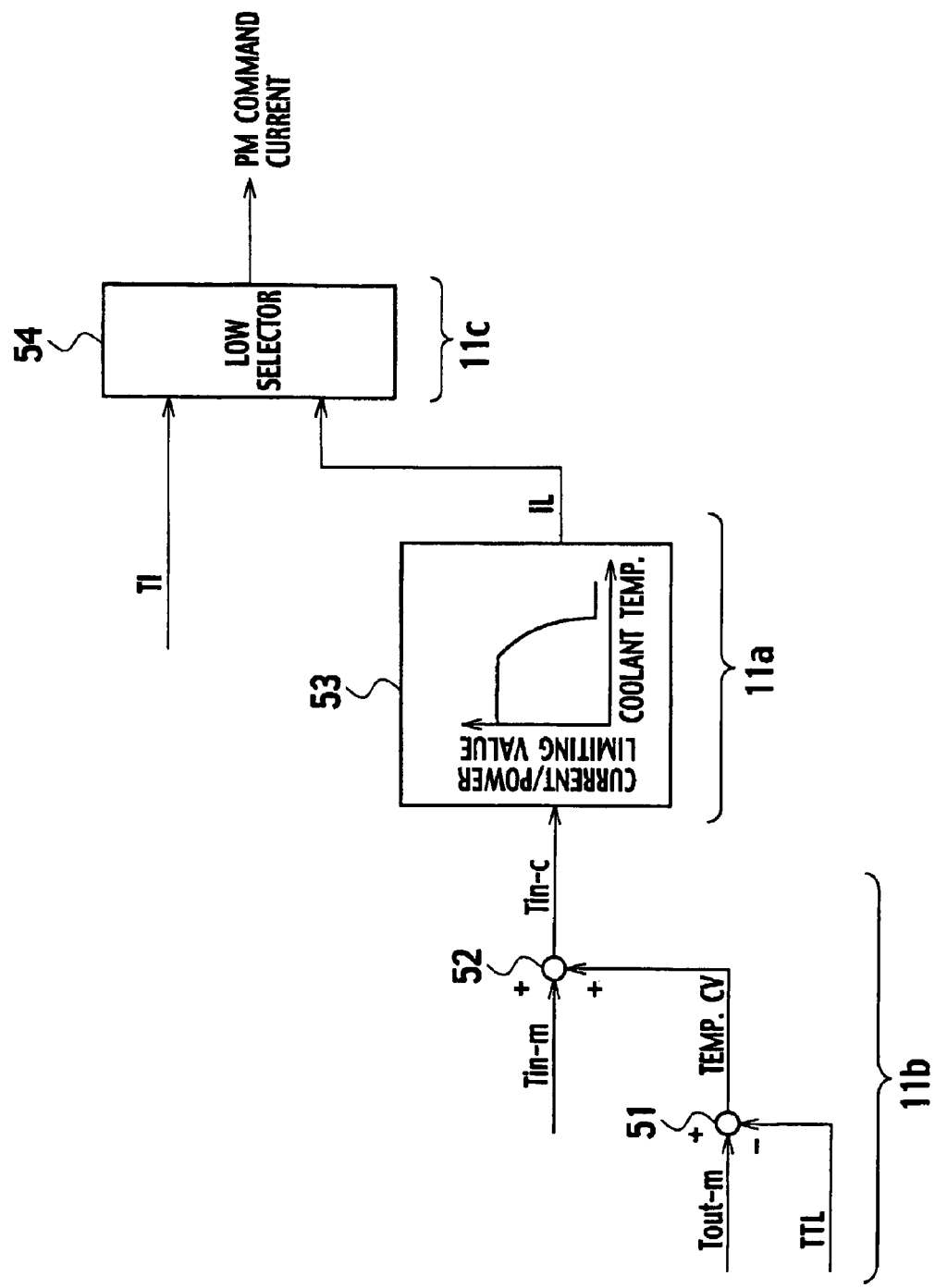
FIG. 2 is a control block diagram for limiting output current in the first embodiment of the present invention.
Figure 3:
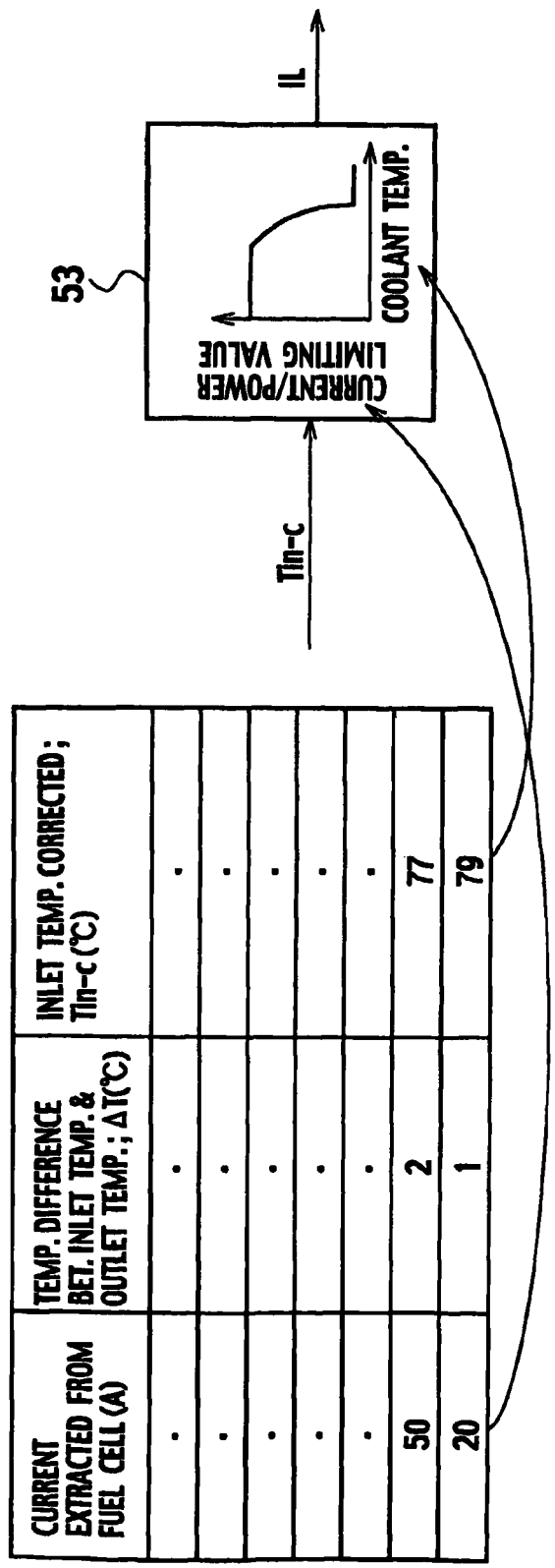
FIG. 3 is a view for explaining a table used in calculation by an output limiting value calculation unit.

As shown in FIG. 2, the output limiting value calculation unit 11a calculates the current limiting value IL according to the inlet coolant temperature Tin-c corrected by the inlet coolant temperature correction unit 11b. FIG. 3 illustrates an example of a table used in this calculation. The amount of heat generated by the fuel cell corresponds to the current extracted therefrom, and can be calculated from previously measured I-V characteristics or the like of the fuel cell. The flow rate of the coolant may be determined according to the current extracted from the fuel cell or may be a fixed flow rate. From a predetermined coolant flow rate and the amount of generated heat which corresponds to the current extracted from the fuel cell, the coolant temperature difference ΔT between the outlet coolant temperature and the inlet coolant temperature of the fuel cell which corresponds to the extracted current is found as illustrated in the table. The temperature obtained by subtracting this temperature difference ΔT from the target temperature limit TTL (e.g., 80° C.) at the coolant outlet is used as an inlet coolant temperature at which a power/current limitation (output limitation) starts to be imposed. The output limiting table 53 has the inlet coolant temperature as the horizontal axis (table input value) of a graph and the current extracted from the fuel cell as the vertical axis (table output value) of the graph.

The inlet coolant temperature correction unit 11b corrects the inlet coolant temperature Tin-c (temperature to be inputted to the table) used in calculating the current limiting value IL by the output limiting value calculation unit 11a, according to the deviation of the outlet coolant temperature Tout-m detected by the outlet coolant temperature sensor 7 from the target temperature limit TTL. The output limiting table 53 of the output limiting value calculation unit 11a is designed based on the relationship between the current extracted from the fuel cell and the temperature difference between the outlet coolant temperature and the inlet coolant temperature of the fuel cell as described above. In the case where the outlet coolant temperature Tout-m is deviated from the target temperature limit TTL, the temperature deviation is returned to the input of the table to make a correction, whereby the outlet coolant temperature Tout-m can be brought closer to the target temperature limit TTL.

The limiting unit 11c limits the value of the command current to be outputted to the power manager 8 using a low selecter circuit 54 (select-low circuit) which selects a smaller value between the target current TI to be extracted, which is transmitted from a load device of the fuel cell, and the current limiting value IL calculated by the output limiting value calculation unit 11a.

Figure 4A:
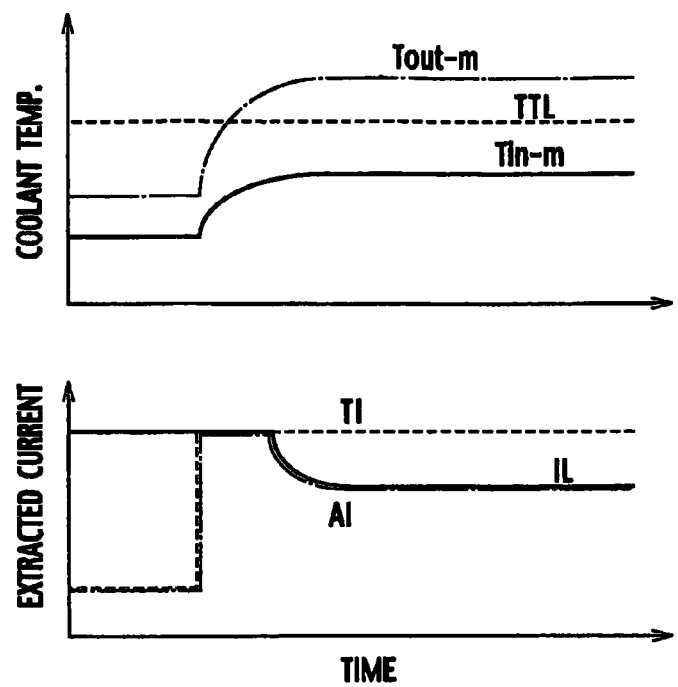
FIG. 4A is a view for explaining the responses of coolant temperature and extracted current in the first embodiment without inlet coolant temperature correction.
Figure 4B:
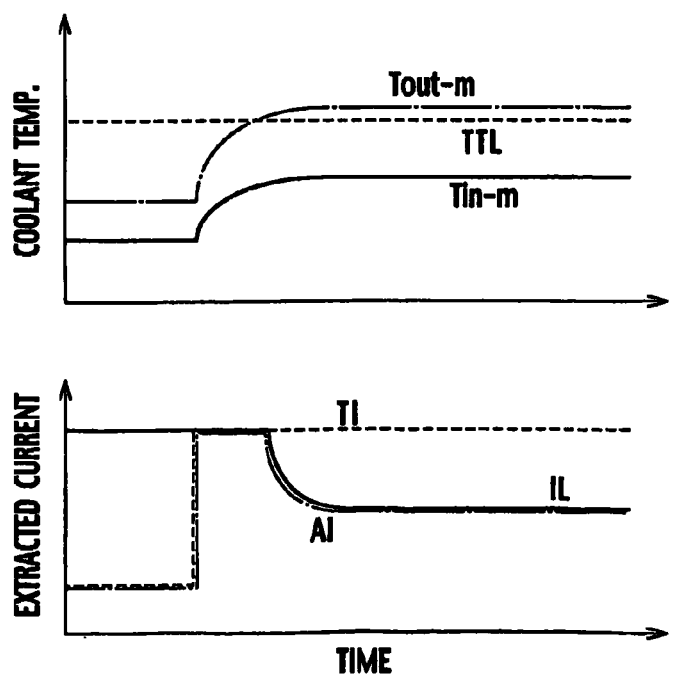
FIG. 4B is a view for explaining the responses of coolant temperature and extracted current in the first embodiment with inlet coolant temperature correction.

FIGS. 4A and 4B illustrate the responses of the current limiting value and the coolant temperatures in this first embodiment. FIG. 4A illustrates the responses of the coolant temperature and the extracted current when the inlet coolant temperature correction is not applied, and FIG. 4B illustrates the responses of the coolant temperature and the extracted current when inlet coolant temperature correction is applied. In the graph illustrating the coolant temperature, the dashed lines indicate the target temperature limit TTL, the dashed-dotted lines indicate the outlet coolant temperature Tout-m, and the full lines indicate the inlet coolant temperature Tin-m. In the graph illustrating the extracted current, the dotted lines indicate the target current TI to be extracted, the dashed-dotted lines indicate actual extracted current AI, and the full lines indicate the current limiting value IL.

In this embodiment, the output limiting value calculation unit 11a is designed with no consideration given to the widening of the coolant temperature difference between the outlet coolant temperature and the inlet coolant temperature of the fuel cell which is caused by changes of fuel cell characteristics and the coolant channel profile with time, in order to raise the coolant temperature Ts at which the output of the fuel cell starts to be limited. Accordingly, in the case of FIG. 4A without inlet coolant temperature correction, after the fuel cell has been operated for a long time, the outlet coolant temperature Tout-m exceeds the target temperature limit TTL because of changes of fuel cell characteristics and the coolant channel profile with time.

By adding the deviation of the outlet coolant temperature Tout-m from the target temperature limit TTL to the temperature to be inputted to the output limiting value calculation unit 11a, the current is further limited as illustrated in FIG. 4B, and an overshoot of the outlet coolant temperature Tout-m can be reduced.

Next, effects of this embodiment will be described. For example, suppose that a configuration is adopted in which the extracted power or current is limited according to the inlet coolant temperature Tin-m so that the outlet coolant temperature Tout-m does not exceed an allowable temperature. After the fuel cell has been operated for a long time, there arises the problem that even at the same power output, the coolant temperature difference between the outlet coolant temperature and the inlet coolant temperature of the fuel cell is widened and that the outlet coolant temperature Tout-m becomes more prone to exceed the allowable temperature, because (a) the amount of generated heat is increased by a reduction of the efficiency of the fuel cell, (b) the coolant flow rate is decreased by a change of the coolant channel profile with time, and the like.

If limitation on the extracted power is designed in consideration of the above-described problem so that the outlet coolant temperature Tout-m does not exceed the allowable temperature, a power/current limitation starts to be imposed when the inlet coolant temperature is lower in an early stage of the operation of a brand-new fuel cell. Thus, the output performance of the fuel cell is deteriorated.

If the system is further provided with means for limiting The power or current extracted from the fuel cell when the outlet coolant temperature Tout-m exceeds a predetermined value, the prevention of excessively high temperature can be reliably realized. On the other hand, there occurs hunting in which the maximum output repeatedly increases and decreases as follows: when the limitation is imposed, the outlet coolant temperature Tout-m decreases to remove the limitation; and, when the output is then increased, the outlet coolant temperature Tout-m increases to cause the limitation to be imposed again.

Figure 10A:
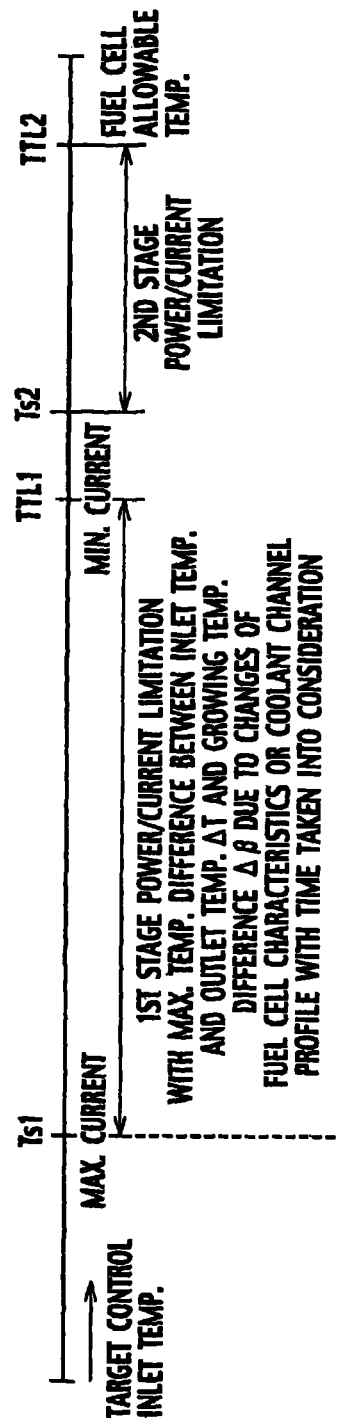
FIG. 10A is a view for explaining the relationship between coolant temperature and power/current limitation in a comparative example.

In the case that a limitation on the extracted power or current based on the inlet coolant temperature, which is a first stage power/current limitation started to be imposed when the inlet coolant temperature reaches Ts1 and ended when the outlet coolant temperature reaches a target outlet coolant temperature TTL1, is set so as to start to be imposed earlier than a limitation based on the outlet coolant temperature Tout-m, which is a second stage power/current limitation started to be imposed when the outlet coolant temperature reaches Ts2 and ended when the outlet coolant temperature reaches a target outlet coolant temperature TTL2, as illustrated in FIG. 10A, in order to avoid the hunting, a smooth limitation can be realized. However, the second stage power/current limitation starts to be imposed at the lower outlet coolant temperature Ts2. Thus, the output performance of the fuel cell is deteriorated.

Figure 10B:
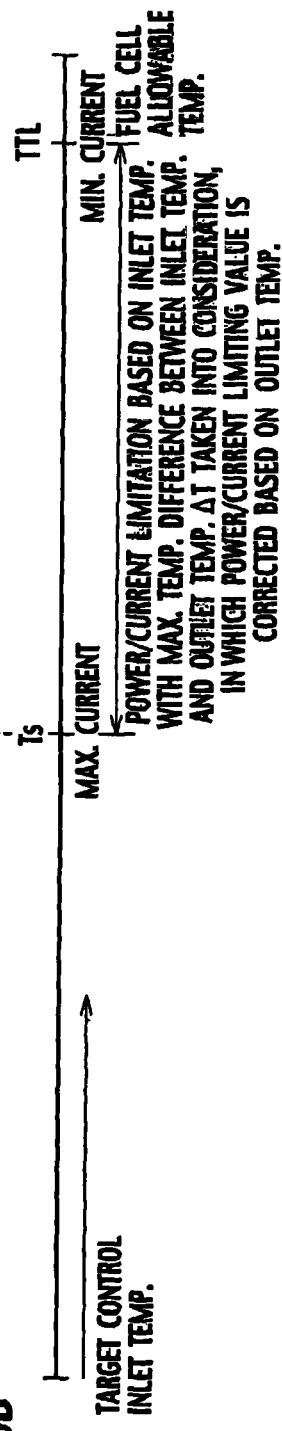
FIG. 10B is a view for explaining the relationship between coolant temperature and power/current limitation in the present invention.

According to this embodiment, it is possible to provide an output limiting device for a fuel cell which can raise, as illustrated in FIG. 10B, the inlet coolant temperature Ts for starting power/current limitation and which can improve the heat balance and the output performance, without the need to initially design power/current limitation in consideration of the growing coolant temperature difference $\Delta\beta$ between the outlet coolant temperature and the inlet coolant temperature of the fuel cell which is caused by changes of fuel cell characteristics and the coolant channel profile with time and without the need to have both of limitation based on the inlet coolant temperature and limitation based on the outlet coolant temperature Tout-m in two stages.

Second Embodiment

Figure 5:
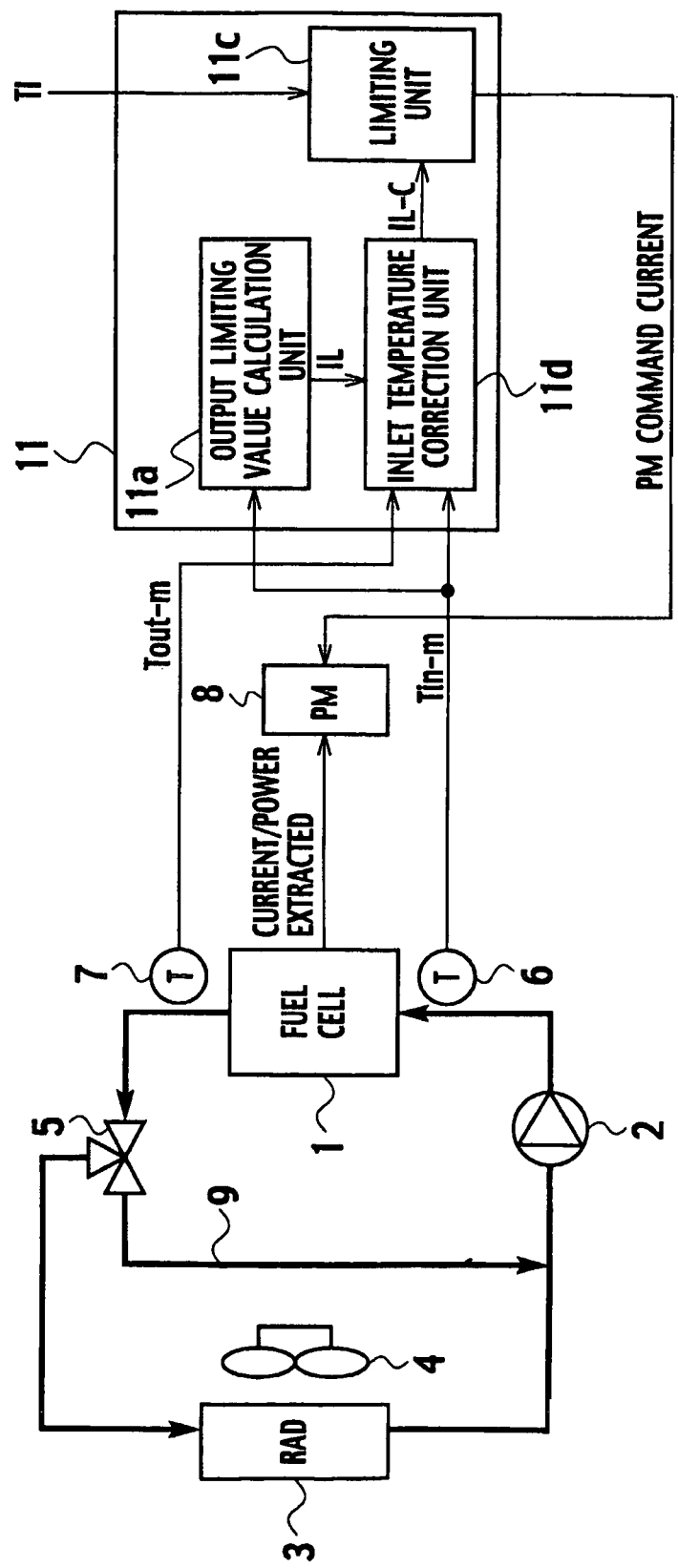
FIG. 5 is a configuration diagram for an output limiting device for a fuel cell according to a second embodiment of the present invention.

FIG. 5 shows the configuration of a fuel cell system including an output limiting device according to a second embodiment of the present invention. In FIG. 5, the cooling system of the fuel cell 1 is the same as that of the first embodiment illustrated in FIG. 1. Accordingly, the same components are denoted by the same reference numerals and will not be further described.

The output limiter 11 in FIG. 5 limits the current extracted from the fuel cell 1 according to the values detected by the inlet and outlet coolant temperature sensors 6 and 7 in order to prevent the temperature of the fuel cell 1 from becoming excessively high and to protect the fuel cell 1 as in the first embodiment. Differences from the first embodiment are in the configuration of the output limiter 11 and the current limiting method.

In FIG. 5, the output limiter 11 of this embodiment includes the output limiting value calculation unit 11a which calculates the current limiting value IL according to the inlet coolant temperature Tin-m detected by the inlet coolant temperature sensor 6, an output limiting value correction unit 11d which corrects the current limiting value IL according to the deviation of the outlet coolant temperature Tout-m detected by the outlet coolant temperature sensor 7 from the target temperature limit TTL at the coolant outlet, and the limiting unit 11c which limits the current extracted from the fuel cell based on the corrected current limiting value IL-c.

The output limiting value correction unit 11d corrects the current limiting value IL calculated by the output limiting value calculation unit 11a according to the deviation of the outlet coolant temperature Tout-m detected by the outlet coolant temperature sensor 7 from the target temperature limit TTL.

The limiting unit 11c limits the target current TI to be extracted, which is transmitted from a load device (e.g., drive motor control unit or secondary battery charge/discharge control unit) of the fuel cell, to a current limiting value IL-c calculated/corrected by the output limiting value correction unit 11d. This current limiting value IL is issued as a command to the power manager 8, and the current extracted from the fuel cell 1 is limited.

Figure 6:
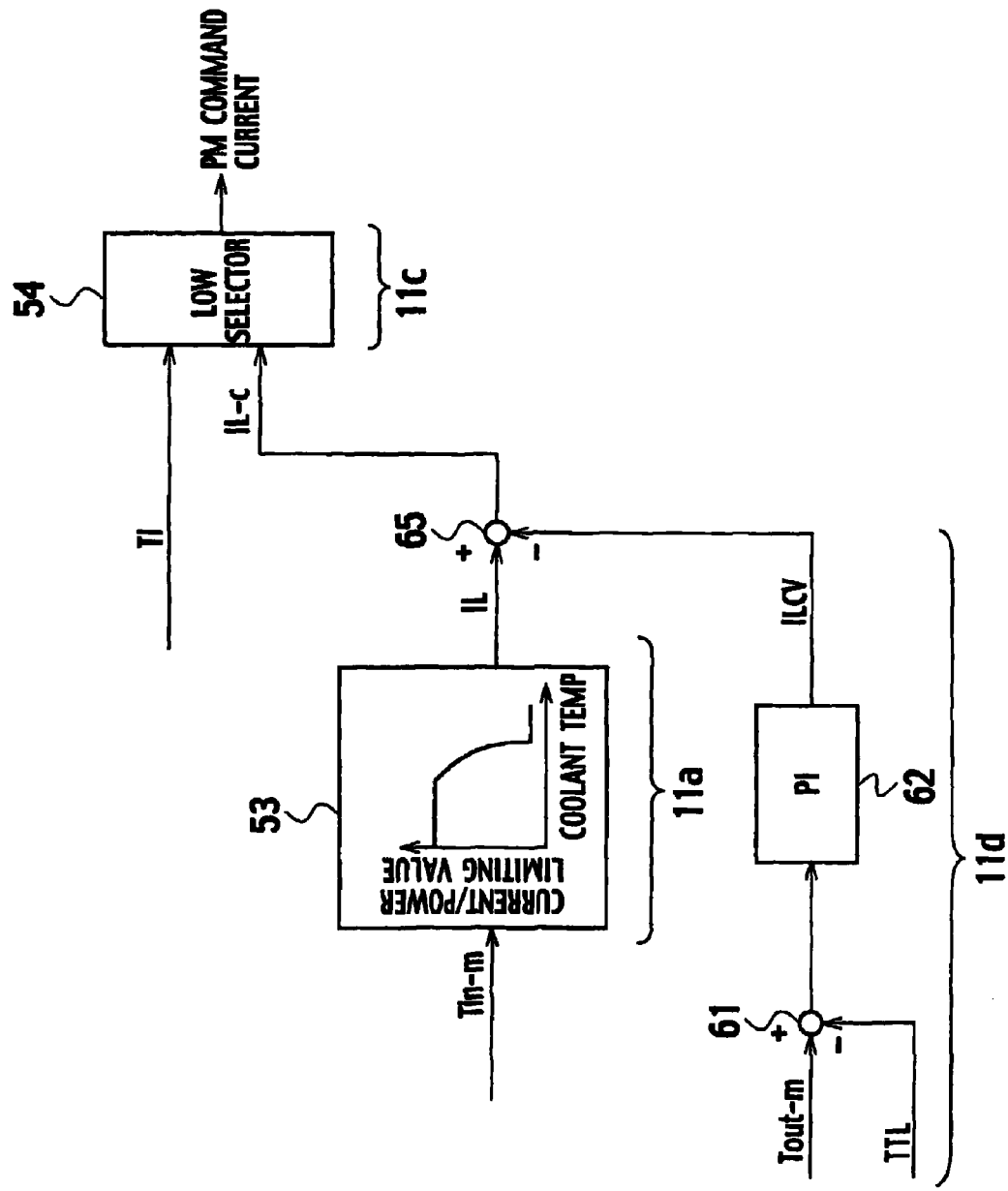
FIG. 6 is a control block diagram for limiting output current in the second embodiment of the present invention.

FIG. 6 is a detailed control block diagram of the output limiter of the second embodiment. The output limiting value calculation unit 11a calculates the current limiting value IL using the output limiting table 53 of FIG. 3 according to the inlet coolant temperature Tin-m detected by the inlet coolant temperature sensor 6.

The output limiting value correction unit lid corrects the current limiting value IL calculated by the output limiting value calculation unit 11a according to the deviation of the value of the outlet coolant temperature Tout-m detected by the outlet coolant temperature sensor 7 from the target temperature limit TTL and the integral of the deviation. Specifically, a subtractor 65 subtracts a current limit correction value ILCV calculated by the output limiting value correction unit lid from the current limiting value IL and outputs the corrected current limiting value IL-c. The output limiting value correction unit lid includes a subtractor 61 which calculates a temperature deviation by subtracting the target temperature limit TTL from the value of the outlet coolant temperature Tout-m detected by the outlet coolant temperature sensor 7, and a PI controller 62 which receives the temperature deviation as an input and outputs the current limit correction value ILCV.

In the case where the outlet coolant temperature Tout-m deviates from the target temperature limit TTL, the current limiting value IL is adjusted by feeding back the deviation. Thus, the outlet coolant temperature Tout-m can be precisely controlled to the target temperature limit TTL or less.

The limiting unit 11c limits the value of a command current to be outputted to the power manager 8 using the low selecter circuit 54 (select-low circuit) which selects a smaller one between the target current TI to be extracted, which is transmitted from a load device of the fuel cell, and the current limiting value IL-c corrected by the output limiting value correction unit 11d.

Figure 7:
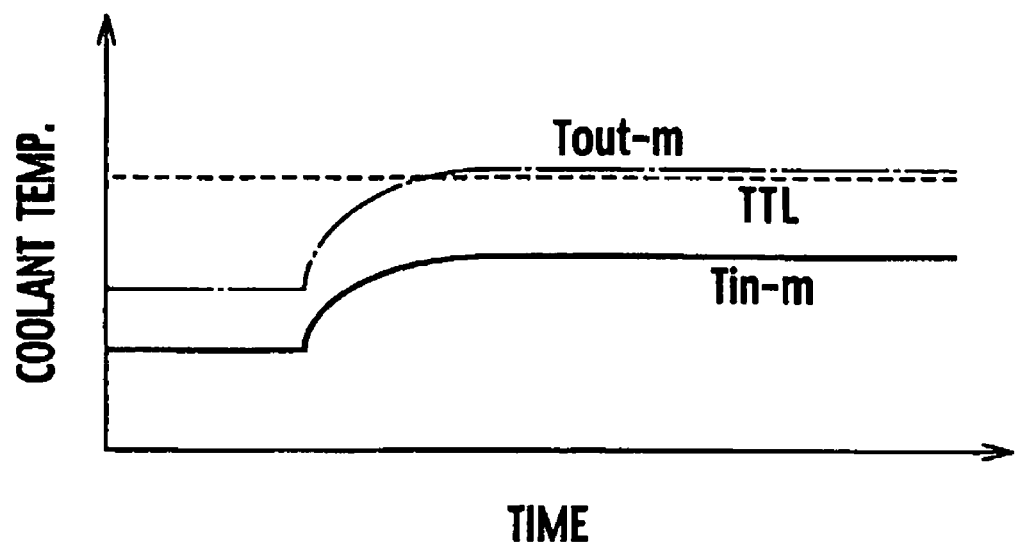
FIG. 7 is a view for explaining the responses of coolant temperature and extracted current in the second embodiment of the present invention.
Figure 7:
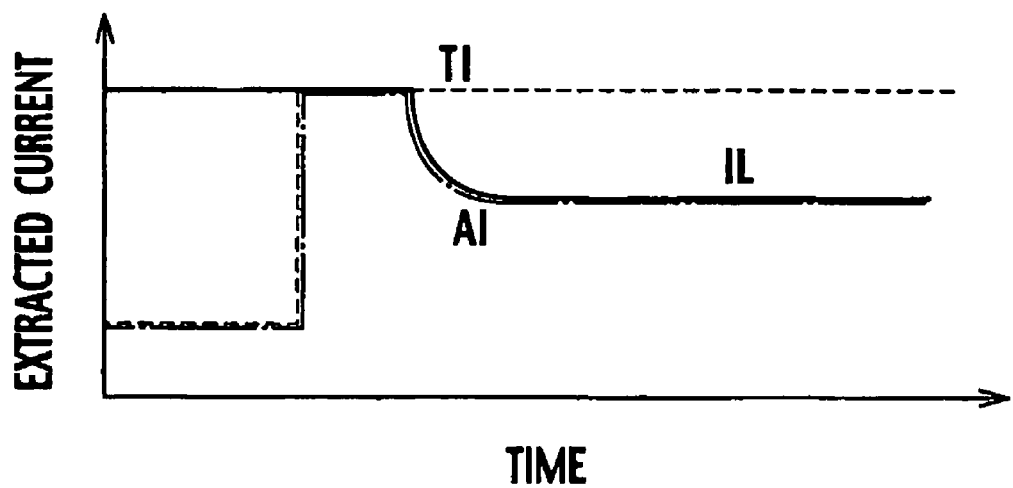

FIG. 7 illustrates the responses of the current limiting value and the coolant temperatures in this second embodiment. In the graph illustrating the coolant temperature, the dashed lines indicate the target temperature limit TTL, the dashed-dotted lines indicate the outlet coolant temperature Tout-m, and the full lines indicate the inlet coolant temperature Tin-m. In the graph illustrating the extracted current, the dotted lines indicate the target current TI to be extracted, the dashed-dotted lines indicate actual extracted current AI, and the full lines indicate the current limiting value IL. In comparison with the first embodiment illustrated in FIG. 4, a value to be applied with the correction using the outlet coolant temperature Tout-m is different. However, as in the first embodiment, the outlet coolant temperature Tout-m can be brought close to the target temperature limit TTL. Further, since the integral of the deviation of the outlet coolant temperature Tout-m from the target temperature limit TTL is fed back, the deviation can be brought closer to zero in a steady state.

Third Embodiment

Figure 8:
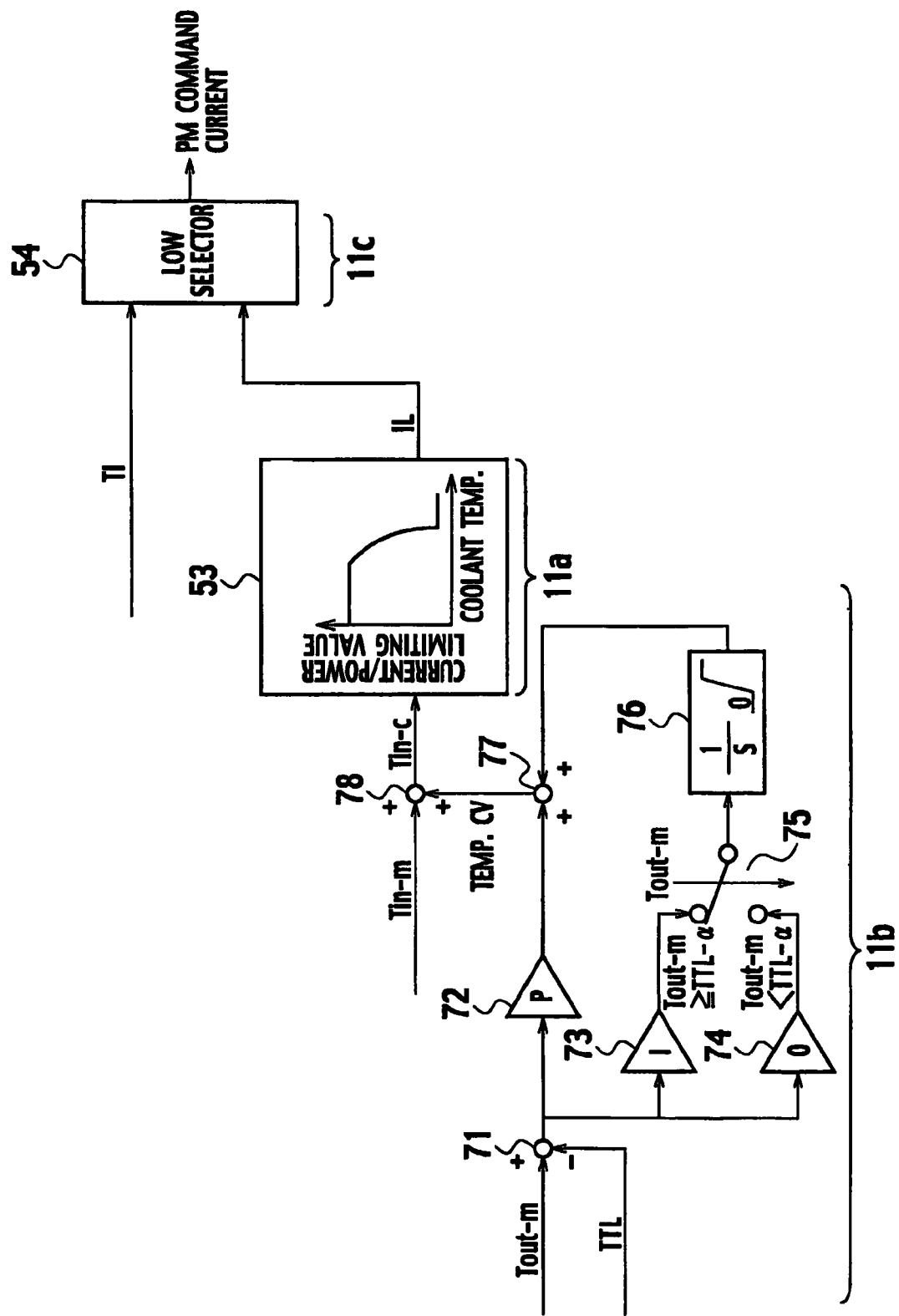
FIG. 8 is a control block diagram for limiting output current in the third embodiment of the present invention.

Next, a third embodiment will be described. A configuration diagram of the third embodiment is the same as that of the first embodiment illustrated in FIG. 1. FIG. 8 is a detailed control block diagram of an output limiter in this third embodiment. In FIG. 8, the output limiter 11 includes the output limiting value calculation unit 11a which calculates the current limiting value IL according to the inlet coolant temperature, the inlet coolant temperature correction unit 11b which corrects the inlet coolant temperature Tin-c used in calculating the current limiting value IL according to the deviation of the outlet coolant temperature Tout-m from the target temperature limit TTL at the coolant outlet and the time integral of the deviation, and the limiting unit 11c which limits the current extracted from the fuel cell based on the current limiting value IL calculated.

The inlet coolant temperature correction unit 11b corrects the inlet coolant temperature Tin-c used in calculating the output limiting value calculation unit 11a according to the deviation of the value of the outlet coolant temperature Tout-m detected by the outlet coolant temperature sensor 7 from the target temperature limit TTL and the integral of the deviation. The output limiting value calculation unit 11a and the limiting unit 11c are the same as those of the first embodiment illustrated in FIG. 2.

According to this embodiment, the inlet coolant temperature Tin-c used in calculating the current limiting value IL is corrected according to the deviation of the outlet coolant temperature Tout-m from the target temperature limit TTL (not more than an allowable temperature) at the coolant outlet and the integral of the deviation. Accordingly, a steady-state deviation is eliminated, and the target temperature limit TTL can be more precisely observed.

Next, referring to FIG. 8, details of the inlet coolant temperature correction unit 11b in this embodiment will be described. First, a subtractor 71 subtracts the target temperature limit TTL from the outlet coolant temperature Tout-m detected by the outlet coolant temperature sensor 7, thus finding a temperature deviation. This temperature deviation is inputted to a proportional operator (P) 72, an integration coefficient multiplier (I) 73, and a zero multiplier 74. The outputs of the integration coefficient multiplier (I) 73 and the zero multiplier 74 are inputted to a switcher 75, and one of them is outputted according to the outlet coolant temperature Tout-m detected by the outlet coolant temperature sensor 7. The output signal of the switcher 75 is integrated by an integrator 76 and becomes one input of an adder 77. The output of the proportional operator 72 becomes the other input of the adder 77. In an adder 78, the output of the adder 77 is added as a temperature correction value (Temp.CV) to the inlet coolant temperature Tin-m detected by the inlet coolant temperature sensor 6 to become an input signal Tin-c to the output limiting table 53.

In this embodiment, the deviation of the outlet coolant temperature Tout-m from the target temperature limit TTL is found, and the power manager command current is calculated so that the temperature deviation becomes zero. Accordingly, the amount of heat generated in the fuel cell 1 is controlled through the power manager command current, and PI control is performed in terms of the outlet coolant temperature Tout-m.

Next, a method of calculating the integral of the temperature deviation by the inlet coolant temperature correction unit 11b will be described. (1) At the time of start, zero or the final value calculated at the time of the previous stop is set as the initial value of the integral term. (2) When the outlet coolant temperature Tout-m is less than a temperature which is the target temperature limit TTL minus a predetermined temperature α, the integration gain is switched from I gain to zero gain by switching the input of the integrator 76 from the output of the integration coefficient multiplier (I) 73 to the output of the zero multiplier 74, and the calculated value of the time integration is held. Here, the predetermined temperature a is set to 1 to 3° C.

This makes it possible to stop the calculation of the integral in a state in which the outlet coolant temperature Tout-m is separated from and less than the target temperature limit TTL (a state in which a power/current limitation is not imposed), and to prevent the integral term from diverging.

Moreover, the integral is calculated to be an optimum value for bringing the deviation of the outlet coolant temperature close to zero while a power/current limitation is being imposed. Accordingly, when a power/current limitation starts to be imposed next, the calculation of the integral is also started from the optimum value by holding the calculated value of the integral in a state in which a power/current limitation is not imposed. Further, an overshoot of the outlet coolant temperature Tout-m can be prevented, and the target temperature limit TTL can be precisely observed.

(3) In the calculation of the integral by the integrator 76 of the output limiter 11, a limiter is provided to set a lower limiting value of zero.

If the outlet coolant temperature Tout-m continues for a long time to be between the target temperature limit TTL and the predetermined temperature at which the integration is started while a power/current limitation is not imposed, the temperature deviation is accumulated, and the integral may diverge. In this embodiment, the limiter (lower limiting value limiter) is provided to set a lower limiting value of zero, whereby the integral can be prevented from diverging and a power/current limitation can be normally imposed.

Figure 9:
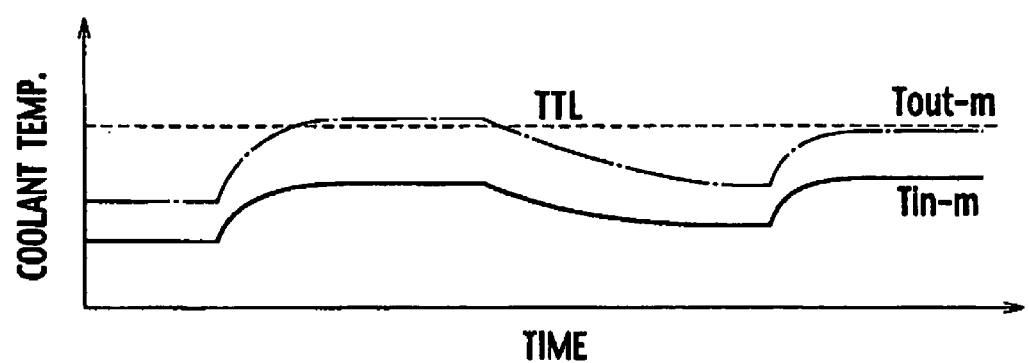
FIG. 9 is a view for explaining the responses of coolant temperature and extracted current in the third embodiment of the present invention.
Figure 9:
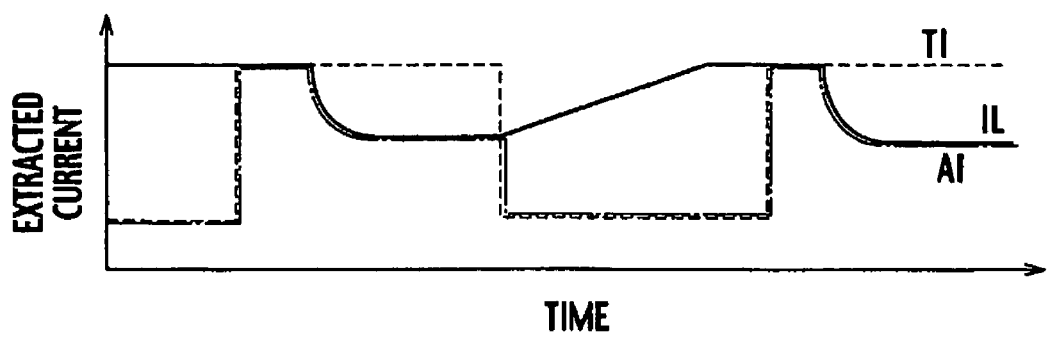

FIG. 9 illustrates the responses of the current limiting value and the temperature in this embodiment. In the graph illustrating the coolant temperature, the dashed lines indicate the target temperature limit TTL, the dashed-dotted lines indicate the outlet coolant temperature Tout-m, and the full lines indicate the inlet coolant temperature Tin-m. In the graph illustrating the extracted current, the dotted lines indicate the target current TI to be extracted, the dashed-dotted lines indicate actual extracted current AI, and the full lines indicate the current limiting value IL. When a power/current limitation is imposed for the first time, the outlet coolant temperature Tout-m may overshoot the target temperature limit TTL to a certain extent. However, when a power/current limitation is imposed next or later, an overshoot of the outlet coolant temperature Tout-m can be prevented because of the aforementioned fact (2).

Further, P-control (proportional control) calculation is always carried out. In the case where a power/current limitation is excessively imposed when the outlet coolant temperature Tout-m is less than the target temperature limit TTL, P-control calculation is always carried out based on the deviation of the outlet coolant temperature Tout-m from the target temperature limit TTL. Thus, until the outlet coolant temperature Tout-m approximates the target temperature limit TTL, the temperature Tin-c to be inputted to the output limiting value calculation unit 11a is corrected to become lower, and power/current limitation can be prevented from being excessively imposed.

The preferred embodiments described herein are illustrative and not restrictive, and the invention may be practiced or embodied in other ways without departing from the spirit or essential character thereof. For example, in the case where a load device of the fuel cell issues not a target current to be extracted but a target power to be extracted as a command to the limiting unit of the output limiter, control similar to those of the above-described embodiments can be performed by converting the target power to be extracted into a target current to be extracted, using a map or the like previously stored.

The scope of the invention being indicated by the claims, and all variations which come within the meaning of claims are intended to be embraced herein.

The present disclosure relates to subject matters contained in Japanese Patent Application No. 2004-333234, filed on Nov. 17, 2004, the disclosure of which is expressly incorporated herein by reference in its entirety.

INDUSTRIAL APPLICABILITY

According to the present invention, the power or current to be extracted from the fuel cell is limited according to the inlet coolant temperature and the outlet coolant temperature. Accordingly, in comparison with limitation based on only the inlet coolant temperature, the outlet coolant temperature can be precisely controlled to an allowable temperature or less. The fuel cell can be prevented from being damaged by excessively high temperature, and power or current can be extracted as much as possible. The present invention can be applied to an output limiting device for a fuel cell.

The invention claimed is:

1. An output limiting device for a fuel cell which is cooled by a coolant supplied thereto, comprising:
an inlet coolant temperature sensor which detects an inlet coolant temperature at a coolant inlet of the fuel cell;
an outlet coolant temperature sensor which detects an outlet coolant temperature at a coolant outlet of the fuel cell; and
an output limiter which limits power or current extracted from the fuel cell according to the detected inlet coolant temperature and the detected outlet coolant temperature,
wherein the output limiter comprises:
an output limiting value calculation unit configured to calculate an output limiting value as a limiting value of the power or current according to the inlet coolant temperature;
an output limiting value correction unit configured to correct the output limiting value to be smaller, as a deviation obtained by subtracting a target temperature limit at the coolant outlet of the fuel cell from the outlet coolant temperature becomes larger; and
a limiting unit configured to limit the power or current extracted from the fuel cell, based on the corrected output limiting value.

2. The output limiting device according to claim 1, wherein the output limiting value correction unit corrects the output limiting value according to a deviation of the outlet coolant temperature from the target temperature limit at the coolant outlet of the fuel cell and a time integral of the deviation.

3. The output limiting device according to claim 2, wherein the output limiting value correction unit calculates the time integral of the deviation when the outlet coolant temperature is not less than a temperature which is the target temperature limit minus a predetermined temperature.

4. The output limiting device according to claim 3, wherein when the outlet coolant temperature is less than the temperature which is the target temperature limit minus the predetermined temperature, the calculation of the time integral is temporarily stopped, and the calculated value of the integral is held.

5. The output limiting device according to claim 2, wherein for the calculation of the time integral, a lower limiting value limiter is set.

6. An output limiting device for a fuel cell which is cooled by a coolant supplied thereto, comprising:
an inlet coolant temperature detecting means for detecting an inlet coolant temperature at a coolant inlet of the fuel cell;
an outlet coolant temperature detecting means for detecting an outlet coolant temperature at a coolant outlet of the fuel cell; and
an output limiting means for limiting power or current extracted from the fuel cell according to the detected inlet coolant temperature and the detected outlet coolant temperature,
wherein the output limiting means comprises:
an output limiting value calculation means for calculating an output limiting value as a limiting value of the power or current according to the inlet coolant temperature;
an output limiting value correction means for correcting the output limiting value to be smaller, as a deviation obtained by subtracting a target temperature limit at the coolant outlet of the fuel cell from the outlet coolant temperature becomes larger; and
a limiting means for limiting the power or current extracted from the fuel cell, based on the corrected output limiting value.

* * * * *